(No Model.)

E. GORSUCH.
TIRE COUPLING.

No. 573,781. Patented Dec. 22, 1896.

Witnesses.
G. M. Anderson
Philip C. Mass.

Inventor.
E. Gorsuch
by E. W. Anderson
his Attorney.

UNITED STATES PATENT OFFICE.

EDWARD GORSUCH, OF ROARING SPRING, PENNSYLVANIA.

TIRE-COUPLING.

SPECIFICATION forming part of Letters Patent No. 573,781, dated December 22, 1896.

Application filed June 25, 1896. Serial No. 596,912. (No model.)

*To all whom it may concern:*

Be it known that I, EDWARD GORSUCH, a citizen of the United States, and a resident of Roaring Spring, in the county of Blair and State of Pennsylvania, have invented certain new and useful Improvements in Tire-Couplings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
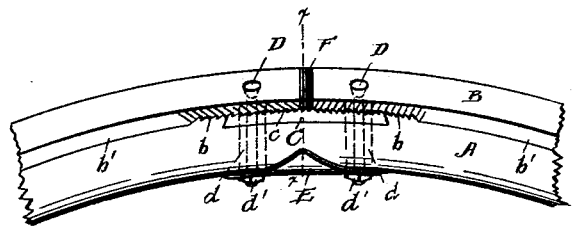
Figure 2:
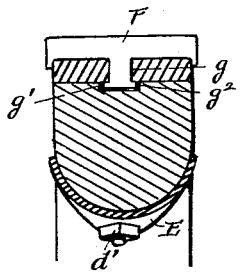
Figure 3:
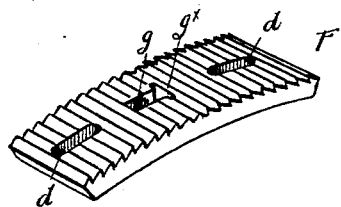
Figure 4:
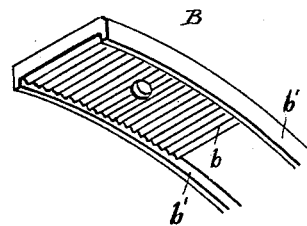
Figure 5:
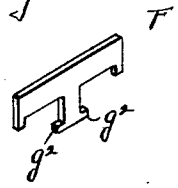

Figure 1 of the drawings shows the invention as in application. Fig. 2 is a section on line $xx$, Fig. 1. Fig. 3 is a perspective view of plate F. Fig. 4 is a perspective view of one of approximating ends of tire. Fig. 5 is a detail view of one of the washers.

This invention is designed to provide a tire-coupling of improved character; and it consists in the novel construction and combination of parts, all as hereinafter described, and pointed out in the appended claims.

Referring to the accompanying drawings, the letter A indicates the felly, and B the tire, whose end portions are approximated and are transversely corrugated or toothed on their inner or under faces, as indicated at $b$. These corrugations or teeth are inclined backwardly or away from the joint. C is a plate upon which the said end portions of the tire are seated, and which is formed upon its upper or outer face with similar corrugations or teeth $c$. These corrugations or teeth are oppositely inclined upon the two end portions of the plate in order that they may be adapted for the proper engagement therewith of the corrugations or teeth $b$. The felly is cut away to seat this plate flush with its surface.

D D are the tire-bolts, which extend through the respective end portions of the tire and through elongated slots $d$ in the plate C and in the felly. E is a plate on the under side of the felly, against which are secured the nuts $d'$ of said bolts.

F designates a series of removable washers which are interposed between the approximated end of the tire. These washers are shown as being of T form, their heads being the full width of the tire and seating flush with the surface thereof. The shanks $f$ of these washers extend through a narrow slot $g$ in the plate C into a cut-away portion $g'$ of the felly, and have at their inner ends short transverse portions $g^2$, which engage the lateral edges of the slot $g$ at the under side and prevent their working out. The slot $g$ is enlarged transversely at one end, as indicated at $g^3$, and the washers can only be inserted or removed at this point.

To tighten the tire, the nuts $d'$ are slacked and a suitable clamping or draw-tightening device is applied to the wheel and operated to draw the two ends of the tire toward each other. In this direction the corrugations or teeth $b$ and $c$ readily slip over each other, while they mutually engage to prevent any slipping of the tire in the opposite direction, as many of the washers F must be removed as may be necessary to permit the tire to be tightened to the proper degree.

The tire B is preferably formed with lateral flanges $b'$, which engage the felly, and the washers F have similar flanges $f$. These flanges cover the lateral edges of the plate C, so that the corrugations or teeth of the parts are entirely covered in.

The coupling above described possesses the advantage that it does not weaken the felly, which is not cut away, except to form the bolt-slots and the slight depression $g'$. The tire also is practically solid, as if in one piece without the joint. The tire can be readily tightened at any time without the necessity for going to a blacksmith.

Having thus described my invention, what I claim as new, and desire to secure by Letters Patent, is—

1. In a tire-coupling, the combination with the tire whose end portions are approximated, but not overlapped, and are formed on their inner faces with transverse corrugations or teeth, of the felly-plate upon which said end portions seat and which has similar teeth or corrugations for engagement therewith, the tire-bolts extending through slots of said plate and of the felly, and the removable T-shaped washers interposed between the approximated ends of the tire, and having shanks which engage a slot of the said felly-plate, substantially as specified.

2. In a tire-coupling, the combination of the flanged tire whose end portions are approximated but not overlapped, and which are transversely toothed or corrugated on their inner faces, the felly-plate having similar teeth or corrugations for engagement therewith, said plate having also bolt-slots, and an intermediate slot, enlarged transversely at one end portion, together with the T-shaped washers designed to be interposed between the approximated ends of the tire, and whose shanks are adapted to engage the said slot and to be inserted into and withdrawn from said slot at its enlarged portion only, substantially as specified.

In testimony whereof I affix my signature in presence of two witnesses.

EDWARD GORSUCH.

Witnesses:
 T. Z. REPLOGLE,
 S. W. LEAMER.